(12) United States Patent
Liu

(10) Patent No.: US 10,468,059 B1
(45) Date of Patent: Nov. 5, 2019

(54) SLIDER WITH MULTIPLE-CHANNEL AIR-BEARING SURFACE

(71) Applicant: Western Digital Technologies, Inc., San Jose, CA (US)

(72) Inventor: Nan Liu, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/156,626

(22) Filed: Oct. 10, 2018

(51) Int. Cl.
*G11B 5/60* (2006.01)
*G11B 5/48* (2006.01)

(52) U.S. Cl.
CPC .......... *G11B 5/6082* (2013.01); *G11B 5/4813* (2013.01)

(58) Field of Classification Search
CPC ........................... G11B 5/6082; G11B 5/4813
USPC ............................................ 360/236.1–236.5
See application file for complete search history.

(56) References Cited

U.S. PATENT DOCUMENTS

| | | | |
|---|---|---|---|
| 8,339,740 B2 | 12/2012 | Zou et al. | |
| 8,374,063 B2 | 2/2013 | Tanaka et al. | |
| 9,001,629 B1 | 4/2015 | Yuan et al. | |
| 9,165,576 B2 | 10/2015 | Cheng et al. | |
| 9,343,088 B2 | 5/2016 | Guler et al. | |
| 9,484,051 B1 | 11/2016 | Krichevsky et al. | |
| 9,704,523 B1 * | 7/2017 | Huang | B29C 64/124 |
| 2003/0128471 A1 | 7/2003 | Bolasna et al. | |
| 2017/0221511 A1 | 8/2017 | Dai et al. | |

OTHER PUBLICATIONS

Rong Ji, Baoxi Xu, Zhanhong Cen, Ji Feng Ying, and Yeow Teck Toh, "Thermal effects on transducer material for heat assisted magnetic recordingapplication," Journal of Applied Physics 117, 17A918 (2015).
Samarth Bhargava and Eli Yablonovitch, "Lowering HAMR Near-Field Transducer Temperature via Inverse Electromagnetic Design," IEEE Transactions on Magnetics, vol. 51, No. 4, Apr. 2015.

* cited by examiner

*Primary Examiner* — Allen T Cao
(74) *Attorney, Agent, or Firm* — Jacobsen IP Law

(57) ABSTRACT

Disclosed are sliders for data storage devices, and data storage devices incorporating such sliders. A slider comprises a leading edge and an air-bearing surface (ABS). The ABS comprises a trailing end comprising a trailing pad, and a plurality of channels configured to direct gas in a direction from the leading edge toward the trailing end, wherein each of the plurality of channels is connected to the trailing end. The plurality of channels may include a center channel, an inner-diameter channel, and/or an outer-diameter channel. The disclosed sliders may be particularly advantageous for lower-pressure operating environments, such as sealed-helium disk drives.

21 Claims, 8 Drawing Sheets

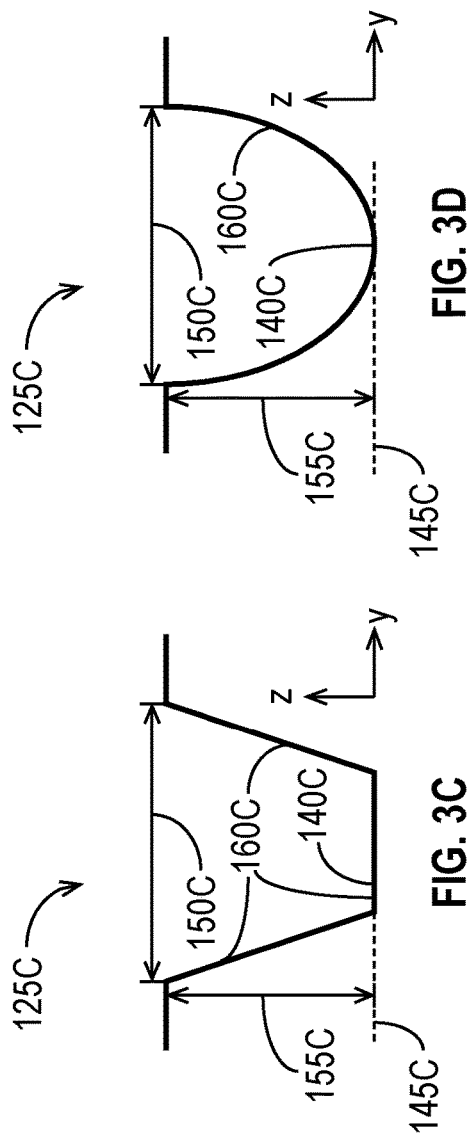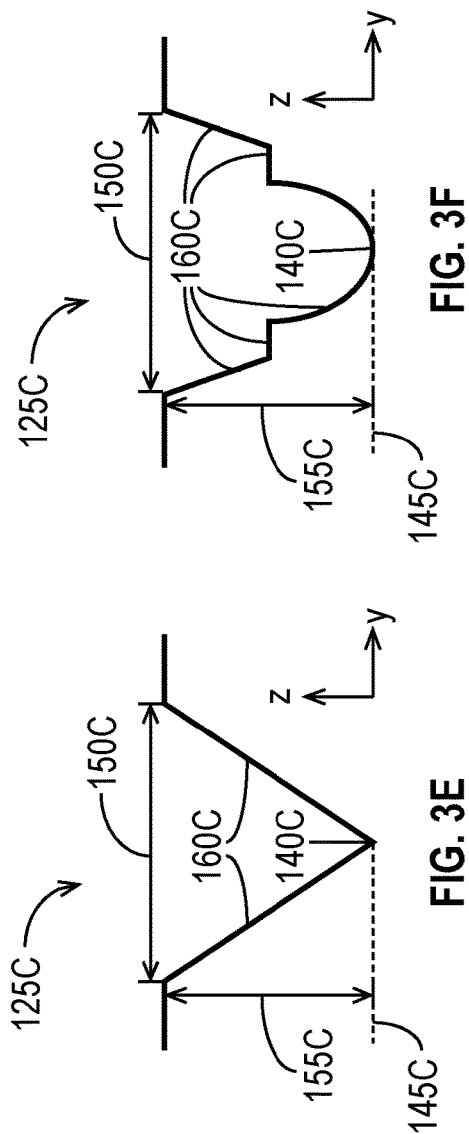

SLIDER WITH MULTIPLE-CHANNEL AIR-BEARING SURFACE

BACKGROUND

Many data storage devices, such as hard disk drives, operate in a standard air (e.g., nitrogen, oxygen, and water vapor mixture) atmosphere. Spinning disks in hard disk drives at high revolutions per minute against the friction of an air atmosphere is largely inefficient and requires a certain amount of power. As an alternative, data storage devices, such as hard disk drives, can be filled with a lower-density gas, such as helium, and sealed to control and maintain the device's internal environment. Sealing mitigates or prevents leakage of internal gases from within the storage device. The use of helium, which has a density that is approximately one-seventh that of air, reduces friction and vibration in the device, thereby creating less drag and turbulence. Consequently, by running the hard disk drive in a less-dense atmosphere, such as an atmosphere of helium or a helium mixture, friction on the disk is reduced, thereby causing the disk to require less power in order to spin at a similar rate as the disks in drives that operate in standard air conditions. The use of helium also reduces the operating temperature of the drive, as well as noise generated by the drive.

The lower ambient pressure in sealed helium drives poses challenges to ABS designs, however. When operating in helium or a helium mixture, rather than air, a slider with a conventional ABS shape (i.e., designed to operate in a standard air atmosphere) can lose its pitching stability. Therefore, there is a need in the art for improved slider gas-bearing surface designs.

SUMMARY

This summary provides a non-limiting, non-exhaustive summary of disclosed embodiments.

Disclosed herein are sliders for data storage devices, and data storage devices comprising such sliders. In some embodiments, a slider for a data storage device comprises a leading edge and an air-bearing surface (ABS), wherein the ABS comprises (1) a trailing end that includes a trailing pad, and (2) a plurality of channels configured to direct gas in a direction from the leading edge toward the trailing end, wherein each of the plurality of channels is connected to the trailing end. In some embodiments, the plurality of channels comprises a center channel and an inner-diameter channel or an outer-diameter channel. In some embodiments, the plurality of channels comprises an inner-diameter channel and an outer-diameter channel. In some embodiments, the plurality of channels comprises a center channel, an inner-diameter channel, and an outer-diameter channel. In some embodiments, the number of the plurality of channels is odd. In some embodiments, the plurality of channels comprises a first channel and a second channel, wherein the first and second channels are adjacent. In some embodiments, a floor of at least one of the plurality of channels is substantially flat.

In some embodiments, the plurality of channels comprises a first channel and a second channel, and, when the ABS is oriented upward, a level of a floor of the first channel is lower than a level of a floor of the second channel. In some such embodiments, the floor of the first channel and the floor of the second channel are substantially flat. In some such embodiments, the first channel is a center channel.

In some embodiments, at least a portion of an interior surface of at least one of the plurality of channels is parabolic. In some embodiments, at least a portion of an interior surface of at least one of the plurality of channels is smooth.

In some embodiments, each of the plurality of channels has a width of at least 1 micron and a depth of at least 1 nanometer.

In some embodiments, a slider for a data storage device comprises a trailing pad disposed closer to a trailing edge of the slider than to a leading edge of the slider, a surface disposed between the trailing pad and the leading edge of the slider, an inner-diameter channel, an outer-diameter channel, and a center channel, each of the inner-diameter, outer-diameter, and center channels for directing gas toward the trailing pad and having an exit area adjacent to the surface. When the air-bearing surface (ABS) of the slider is oriented upward, a level of the trailing pad is above a level of the surface, the inner-diameter channel is at a first depth below the level of the trailing pad, the center channel is at a second depth below the level of the trailing pad, and the outer-diameter channel is at a third depth below the trailing pad. In some embodiments, the second depth is greater than one or both of the first and third depths. In some embodiments, the first and third depths are substantially equal.

In some embodiments at least one of the inner-diameter channel, the outer-diameter channel, or the center channel has a substantially smooth interior. In some embodiments, at least one of the inner-diameter channel, the outer-diameter channel, or the center channel has a parabolic interior. In some embodiments, at least one of the inner channel, the outer-diameter channel, or the center channel has a substantially flat floor.

BRIEF DESCRIPTION OF THE DRAWINGS

The disclosure herein is illustrated by way of example, and not by way of limitation, in the figures of the accompanying drawings, in which like reference numerals refer to similar elements and in which:

FIGS. 3B through 3F illustrate channel interior surface characteristics in accordance with some embodiments.

DETAILED DESCRIPTION

The following description is made for the purpose of illustrating the general principles of the present disclosure and is not meant to limit the inventive concepts claimed herein. Furthermore, particular features described herein can be used in combination with other described features in various possible combinations and permutations.

Figure 1:
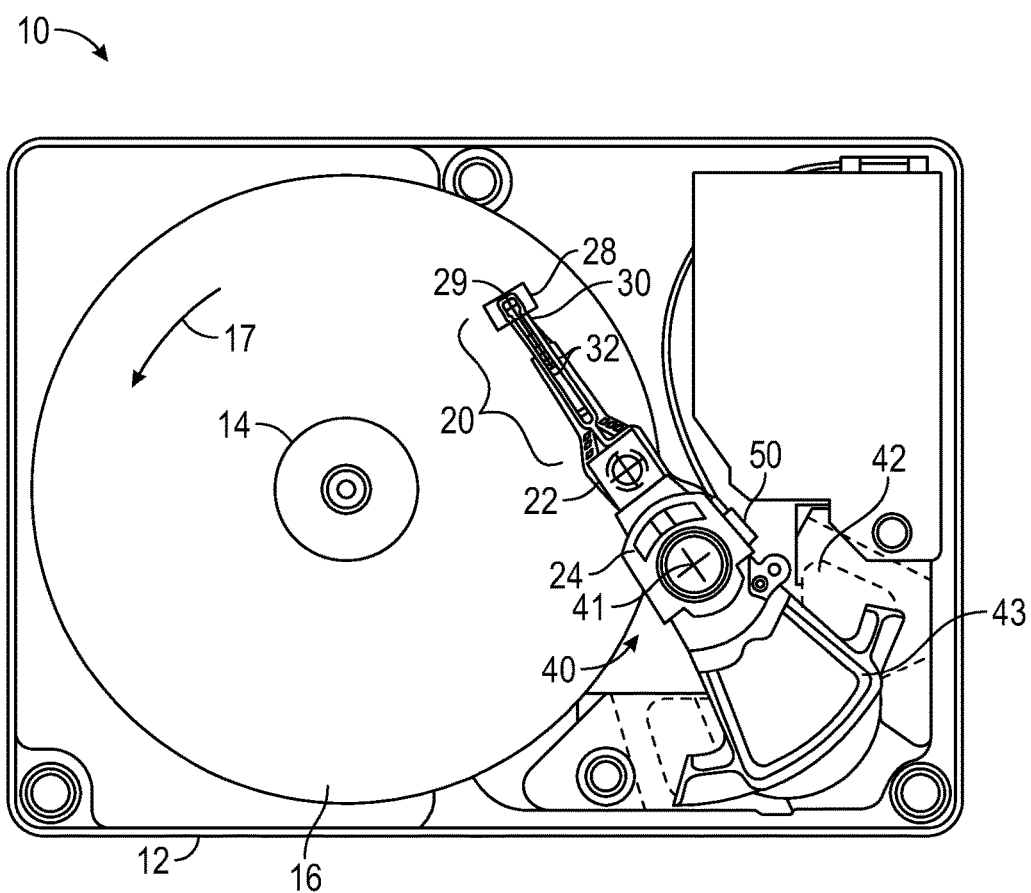
FIG. 1 illustrates a data storage device in accordance with some embodiments.

FIG. 1 is a top view of a head/disk assembly of a hard disk drive 10 with the cover removed. The disk drive 10 includes a rigid base 12 supporting a spindle 14 that supports at least one disk 16. The spindle 14 is rotated by a spindle motor (not shown), which, in operation, rotates the at least one disk 16 in the direction shown by the curved arrow 17. The hard disk drive 10 has at least one load beam assembly 20 having an integrated lead suspension (ILS) or flexure 30 with an array 32 of electrically conductive interconnect traces or lines. The at least one load beam assembly 20 is attached to rigid arms 22 connected to an E-shaped support structure, sometimes called an E-block 24. The flexure 30 is attached to an air-bearing (or, in the case that helium or another gas is used instead of air inside the disk drive, a gas-bearing) slider 28. A magnetic recording read/write head 29 is located at the end or trailing surface of slider 28. The flexure 30 enables the slider 28 to "pitch" and "roll" on an air (or gas) bearing generated by the rotating disk 16.

The disk drive 10 also includes a rotary actuator assembly 40 rotationally mounted to the rigid base 12 at a pivot point 41. The actuator assembly 40 may include a voice coil motor (VCM) actuator that includes a magnet assembly 42 fixed to the base 12 and a voice coil 43. When energized by control circuitry (not shown), the voice coil 43 moves and thereby rotates E-block 24 with attached arms 22 and the at least one load beam assembly 20 to position the read/write head 29 over the data tracks on the disk 16. The trace interconnect array 32 connects at one end to the read/write head 29 and at its other end to read/write circuitry contained in an electrical module or chip 50, which, in the exemplary disk drive 10 of FIG. 1, is secured to a side of the E-block 24. The chip 50 includes a read/write integrated circuit (R/W IC).

As the disk 16 rotates, the disk 16 drags gas (which may be air, helium, a mixture of gases, etc.) under the slider 100 and along the air-bearing surface (ABS) of the slider 100 in a direction approximately parallel to the tangential velocity of the disk 16. It is to be understood that the term "air-bearing surface (ABS)" is used herein to refer to the gas-bearing surface of a slider, regardless of whether the gas within the drive is air, another gas (e.g., helium), or a combination of gases (e.g., oxygen and helium). As the air or gas passes under the ABS, compression of the air or gas along the air flow path causes the pressure between the disk 16 and the ABS to increase, which creates a hydrodynamic lifting force that counteracts the tendency of the at least one load beam assembly 20 to push the slider 100 toward the disk 16. The slider 100 thus flies above the disk 16 but in close proximity to the surface of the disk 16.

The slider 28 supports a read/write head 29. In operation, after the voice coil 43 has positioned the read/write head 29 over the data tracks on the disk 16, the read/write head 29 may be used to write information to one or more tracks on the surface of the disk 16 and to read previously-recorded information from the tracks on the surface of the disk 16. The write portion of the read/write head 29 may be capable of heat-assisted magnetic recording (HAMR) or microwave-assisted magnetic recording (MAMR), or it may be a conventional write head. The tracks may comprise discrete data islands of magnetizable material (e.g., bit-patterned media), or the disk 16 may have a conventional continuous magnetic recording layer of magnetizable material. Processing circuitry in the hard drive 10 (e.g., on the chip 50) provides to the read/write head 29 signals representing information to be written to the disk 16 and receives from the read/write head 29 signals representing information read from the disk 16.

To read information from the disk 16, the read/write head 29 may include at least one read sensor. The read sensor(s) in the read/write head 29 may include, for example, one or more giant magnetoresistance (GMR) sensors, tunneling magnetoresistance (TMR) sensors, or another type of magnetoresistive sensor. When the slider 28 passes over a track on the disk 16, the read/write head 29 detects changes in resistance due to magnetic field variations recorded on the disk 16, which represent the recorded bits.

FIG. 1 illustrates only one disk 16 surface with associated slider 28 and read/write head 29, but there may be multiple disks 16 stacked on a hub that is rotated by a spindle motor, with a separate slider 28 and read/write head 29 associated with each surface of each disk 16.

As explained above, data storage devices, such as hard disk drives, can be filled with a lower-density gas, such as helium, hydrogen, or a mixture of helium, hydrogen, or other light gas, and sealed. This approach can reduce friction and vibration in the device, and reduce the device's power consumption, operating temperature, and noise production. Operating in lower-pressure environments, however, can cause issues with slider flight. For example, the lower gas pressure can cause a slider with a conventional ABS (i.e., designed to operate in a standard air atmosphere) to lose its pitching stability. As a result, it may be difficult for the slider to fly, or to fly at a substantially constant flying height and controlled pitch, because of diminished gas flowing from the leading edge to the trailing edge between the slider and the disk surface. Providing the desired lift and pitch stiffness within the confines of prior art techniques may require some undesirable tradeoffs in design choices.

Disclosed herein are slider ABS designs that provide multiple channels to direct gas in a direction from the leading edge toward the trailing edge, thereby compressing more gas than conventional ABS designs and improving slider flight characteristics.

Figure 2:
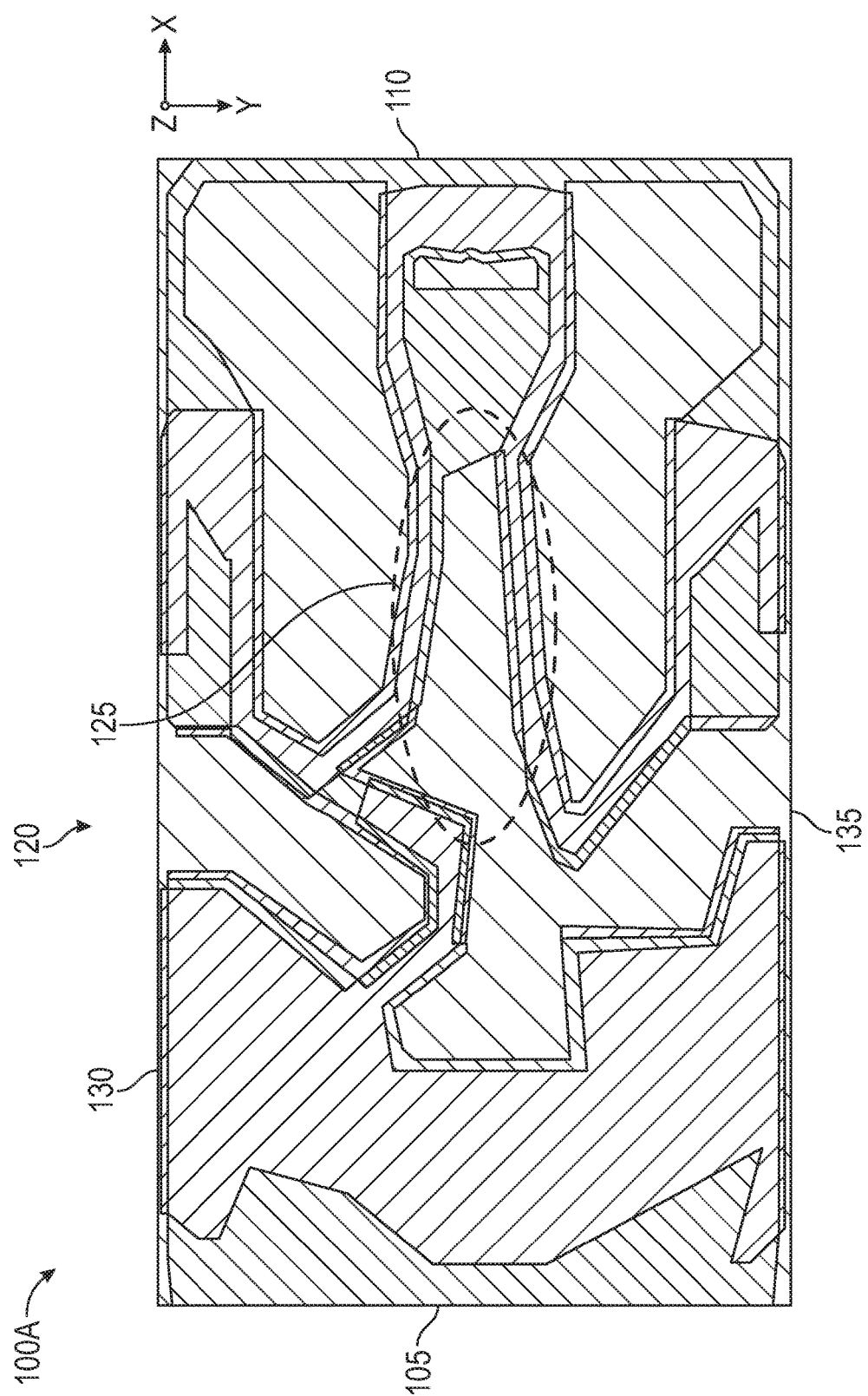
FIG. 2 is an ABS view of a slider.

FIG. 2 illustrates an example of a slider 100A. The slider 100A has a leading edge 105, a trailing edge 110, an inner diameter edge 130, and an outer diameter edge 135. The slider 100A has an ABS 120, which includes a single channel 125 that directs gas in the direction from the leading edge 105 toward the trailing edge 110. Although the slider 100A may provide adequate performance in a standard air atmosphere, its performance may degrade significantly in lower-pressure conditions because there may be insufficient gas pressure to provide the desired pitch stiffness.

Figure 3A:
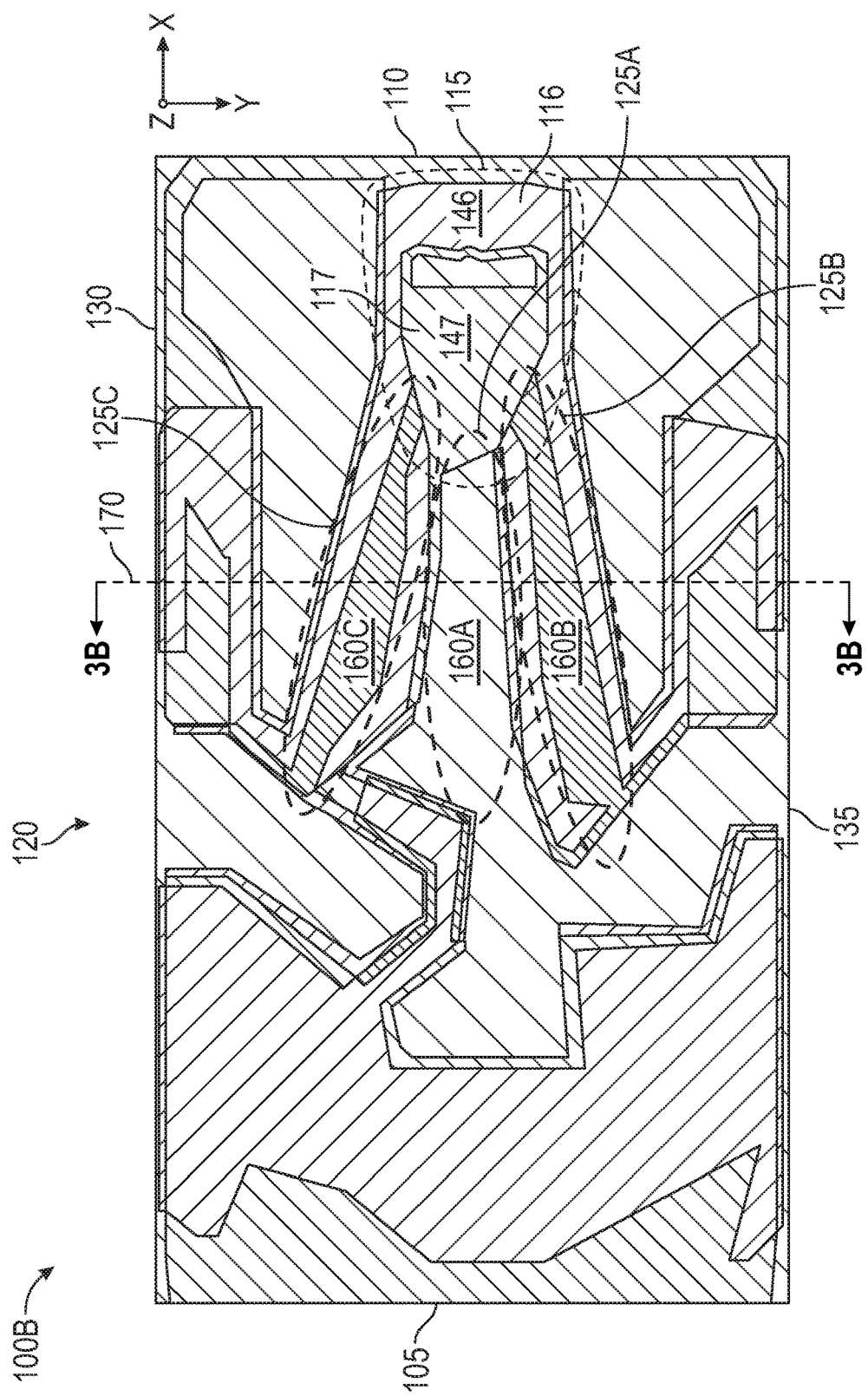
FIG. 3A is an ABS view of a slider in accordance with some embodiments.

FIG. 3A is an ABS view of a slider 100B in accordance with some embodiments. The slider 100B has a leading edge 105, a trailing edge 110, an inner diameter edge 130, and an outer diameter edge 135. The slider 100B has an ABS 120, which includes a trailing end 115. The trailing end 115 comprises a trailing pad 116 and a surface 117. The trailing pad 116 may, for example, accommodate a read/write head 29 of a disk drive 10. When the ABS 120 is oriented upward, the surface 117 is at a level 147 that is below the level 146 of the trailing pad 116. Stated another way, using the axes shown in FIG. 3A, with the z-axis pointing out of the page, the level 146 of the trailing pad 116 is at a higher z-value than is the level 147 of the surface 117.

In the exemplary embodiment of FIG. 3A, the ABS 120 also includes three channels 125, namely a center channel 125A, an inner-diameter channel 125C, and an outer-diameter channel 125B. The channels 125A and 125B are adjacent to each other, and the channels 125A and 125C are also adjacent to each other. Each of the channels 125A, 125B, 125C is configured to direct gas toward the trailing end 115. Because of the rotation of the disk 16 in a hard drive 10, gas flows generally from the leading edge 105 toward the trailing edge 110, and the channels 125A, 125B, and 125C are oriented to capture gas and increase the gas pressure at the trailing end 115.

As shown in the example slider 100B shown in FIG. 3A, each of the channels 125A, 125B, 125C is connected to the trailing end 115. In other words, in this example, each channel 125A, 125B, and 125C is adjacent to (i.e., abuts) the surface 117. Because of the direction of gas flow, the exit area of each of the channels is adjacent to the surface 117.

Each of the channels 125A, 125B, 125C has a respective interior surface 160A, 160B, 160C. As explained below, the interior surfaces 160A, 160B, and 160C may have a variety of characteristics (e.g., size, shape, dimensions, etc.).

Figure 3B:
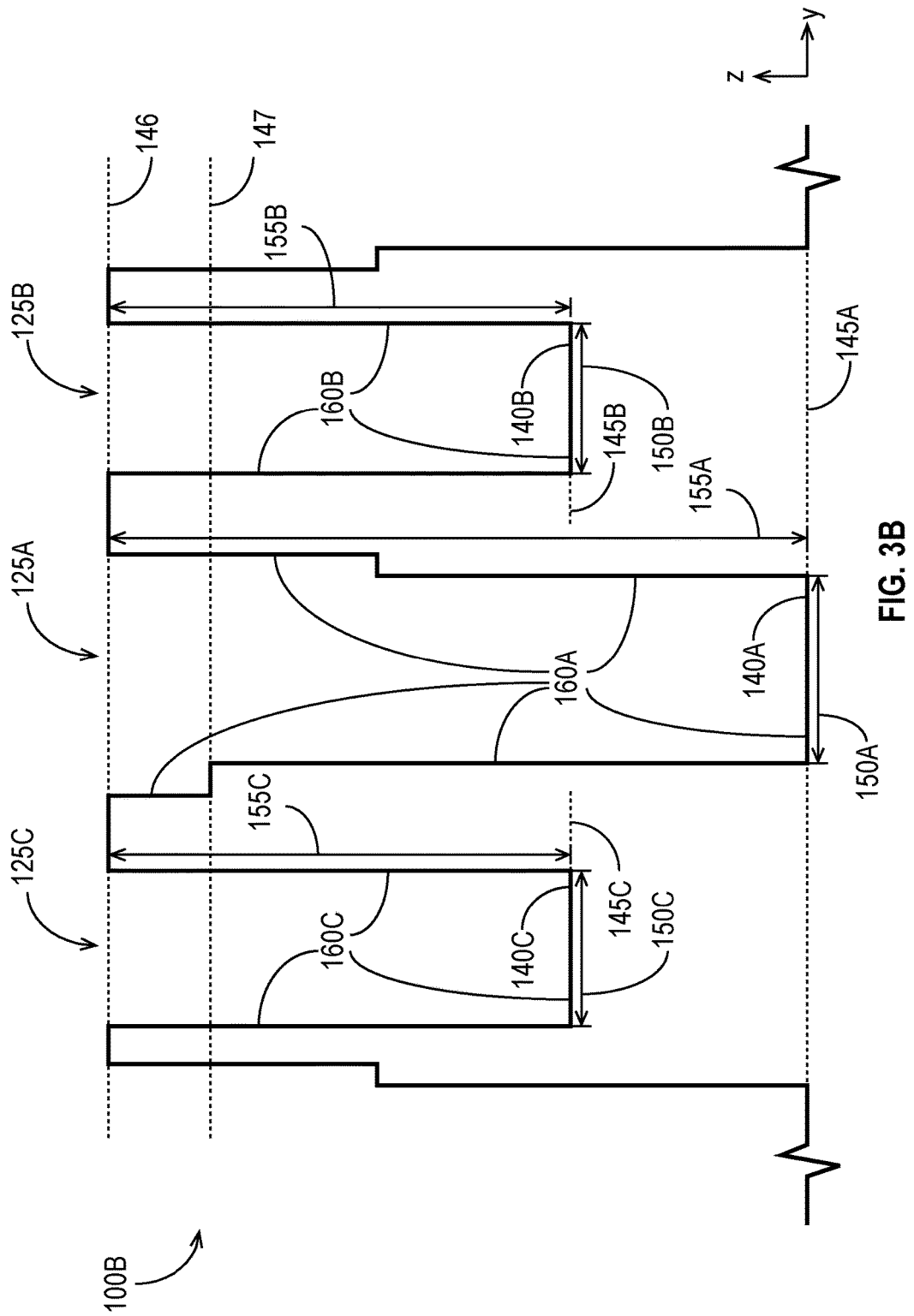

FIG. 3B illustrates a portion of an exemplary slice of the exemplary slider 120B taken along the axis 170 shown in FIG. 3A. As shown in FIG. 3B, using the axes shown in FIGS. 3A and 3B, the slice is in the y-z plane. The center channel 125A has a width 150A and a depth 155A, where the depth 155A is shown relative to the level 146 of the trailing pad 116. In some embodiments, the width 150A is at least 1 micron. In some embodiments, the depth 155A is at least 1 nanometer (nm). The center channel 125A has a surface 160A that, in the example shown, comprises a floor 140A and side walls. In the embodiment of FIG. 3B, the floor 140A is flat and at a level 145A. Thus, in the example of FIG. 3B, the center channel 125A has an interior surface 160A that has a substantially rectangular cross-section near the floor 140A. As is discussed elsewhere, the interior surface 160A may have myriad other characteristics. In particular, it need not be rectangular or smooth.

The inner-diameter channel 125C has a width 150C and a depth 155C, where the depth 155C is shown relative to the level 146 of the trailing pad 116. In some embodiments, the width 150C is at least 1 micron. In some embodiments, the depth 155C is at least 1 nm. The inner-diameter channel 125C has an interior surface 160C, which comprises a floor 140C and side walls. In the embodiment of FIG. 3B, the floor 140C is flat and at a level 145C, which, when the ABS 120 is oriented upward, is above the level 145A of the center channel 125A. In other embodiments, the level 145C is below the level 145A when the ABS 120 is oriented upward. In the example of FIG. 3B, the inner-diameter channel 125C has an interior surface 160C that has a substantially rectangular cross-section near the floor 140C. As is discussed elsewhere, the interior surface 160C may have myriad other characteristics. In particular, it need not be rectangular or smooth.

The outer-diameter channel 125B has a width 150B and a depth 155B, where the depth 155B is shown relative to the level 146 of the trailing pad 116. In the exemplary embodiment illustrated in FIG. 3B, the depth 155B is substantially equal to the depth 155C of the inner-diameter channel 125C. In other embodiments, the depths 155B, 155C differ. In some embodiments, the width 150B is at least 1 micron. In some embodiments, the depth 155B is at least 1 nm. The outer-diameter channel 125B has an interior surface 160B, which comprises a floor 140B and side walls. In the embodiment of FIG. 3B, the floor 140B is flat and at a level 145B, which, when the ABS 120 is oriented upward, is above the level 145A of the center channel 125A. In other embodiments, the level 145B is below the level 145A when the ABS 120 is oriented upward. Moreover, although the level 145B is shown in FIG. 3B as being at the same level as the level 145C, the levels 145B and 145C need not be the same. In the example of FIG. 3B, the outer-diameter channel 125B has an interior surface 160B that has a substantially rectangular cross-section near the floor 140B. As is discussed elsewhere, the interior surface 160B may have myriad other characteristics. In particular, it need not be rectangular or smooth.

In the exemplary embodiment of FIG. 3B, the depth 155A is greater than either of the two depths 155B, 155C, but there is no requirement for the center channel 125A to be deeper than one or both of the channels 125B, 125C. In general, each of the channels 125 present may be at a depth 155 that enables a desired increase in gas pressure.

In the exemplary embodiment illustrated in FIG. 3B, each of the channels 125A, 125B, 125C has an interior that has substantially vertical side walls and a substantially flat floor 140A, 140B, or 140C. In general, the interior surfaces 160A, 160B, 160C of the channels 125A, 125B, 125C may have any suitable characteristics (e.g., size, shape, smoothness (or lack thereof), uniformity (or lack thereof), etc.) to provide the desired slider 28 flight performance under a specified set of conditions.

FIG. 3C illustrates the inner-diameter channel 125C with an interior surface 160C that, in the slice taken at the axis 170, is shaped like a trapezoid. The floor 140C of the inner-diameter channel 125C is substantially flat, smooth, and horizontal, and the interior surface 160C has walls extending upward at angles from the floor 140C (when the ABS 120 is oriented upward). The floor 140C is at a level 145C, which, as mentioned previously, may be above or below one or both of the levels 145A, 145B when the ABS 120 is oriented upward. The depth 155C of the inner-diameter channel 125C is shown relative to the level 146 of the trailing pad 116.

FIG. 3D illustrates the inner-diameter channel 125C with an interior surface 160C that, in the slice taken at the axis 170, is parabolic. Thus, in this particular slice, the floor 140C degenerates to a single point at the deepest part of the parabola. The floor 140C is at the level 145C, at a depth 155C from the level 146 of the trailing pad 116. As explained previously, the level 145C may be above or below one or both of the levels 145A, 145B when the ABS 120 is oriented upward. In the slice of the inner-diameter channel 125C shown in FIG. 3D, the interior surface 160C of the channel 125C is smooth.

FIG. 3E illustrates the inner-diameter channel 125C with an interior surface 160C that, in the slice taken at the axis 170, is v-shaped. In this example, the floor 140C degenerates to a single point at the bottom of the "v." The floor 140C is at the level 145C, at a depth 155C from the level 146 of the trailing pad 116. As explained previously, the level 145C may be above or below one or both of the levels 145A, 145B when the ABS 120 is oriented upward. In the slice of the inner-diameter channel 125C shown in FIG. 3E, each of the interior walls of the channel 125C is smooth and linear.

The interior surface 160 of a channel 125 may include a variety or combination of features. For example, FIG. 3F illustrates the inner-diameter channel 125C with an interior surface 160C that has a parabolic portion near its deepest region (with the floor 140C the degenerate case of being a point), flat and horizontal transition regions, and then upward sloping walls. The floor 140C is at the level 145C, at a depth 155C from the level 146 of the trailing pad 116. As explained previously, the level 145C may be above or below one or both of the levels 145A, 145B when the ABS 120 is oriented upward. The interior surface 160C shown in FIG. 3F is smooth.

FIGS. 3C through 3F illustrate several exemplary interior surfaces 160C of the channel 125C. It is to be understood that the channels 125A and 125B can also have interiors 160A, 160B that are similar or identical to those shown in FIGS. 3C through 3F. Likewise, FIGS. 3C through 3F show just a few of myriad possible interior surfaces 160C. They are provided as examples and are not intended to be limiting. Other interior characteristics are specifically contemplated. For example, an interior surface 160 may include protrusions and/or crevices, or any other feature that can affect gas pressurization.

It is also to be understood that the characteristics of the interior surface 160 of a selected channel 125 may be different at different positions. In other words, referring again to FIG. 3A, if the axis 170 were moved left or right of the location shown in FIG. 3A, the characteristics of the interior surface 160 of one or more of the channels 125 may change. Also, different channels 125 may have the same or similar characteristics (e.g., as shown in FIG. 3B), or their characteristics may differ in one or more respects (e.g., one channel 125 may have an interior surface 160 like that shown in FIG. 3C, and another channel 125 may have an interior surface 160 like that shown in FIG. 3D, etc.). In general, each channel 125 (e.g., 125A, 125B, and 125C) may have whatever characteristics provide a desired improvement in slider 28 performance. The channels 125 may be identical in one or more respects, or they may be substantially different.

Figure 4:
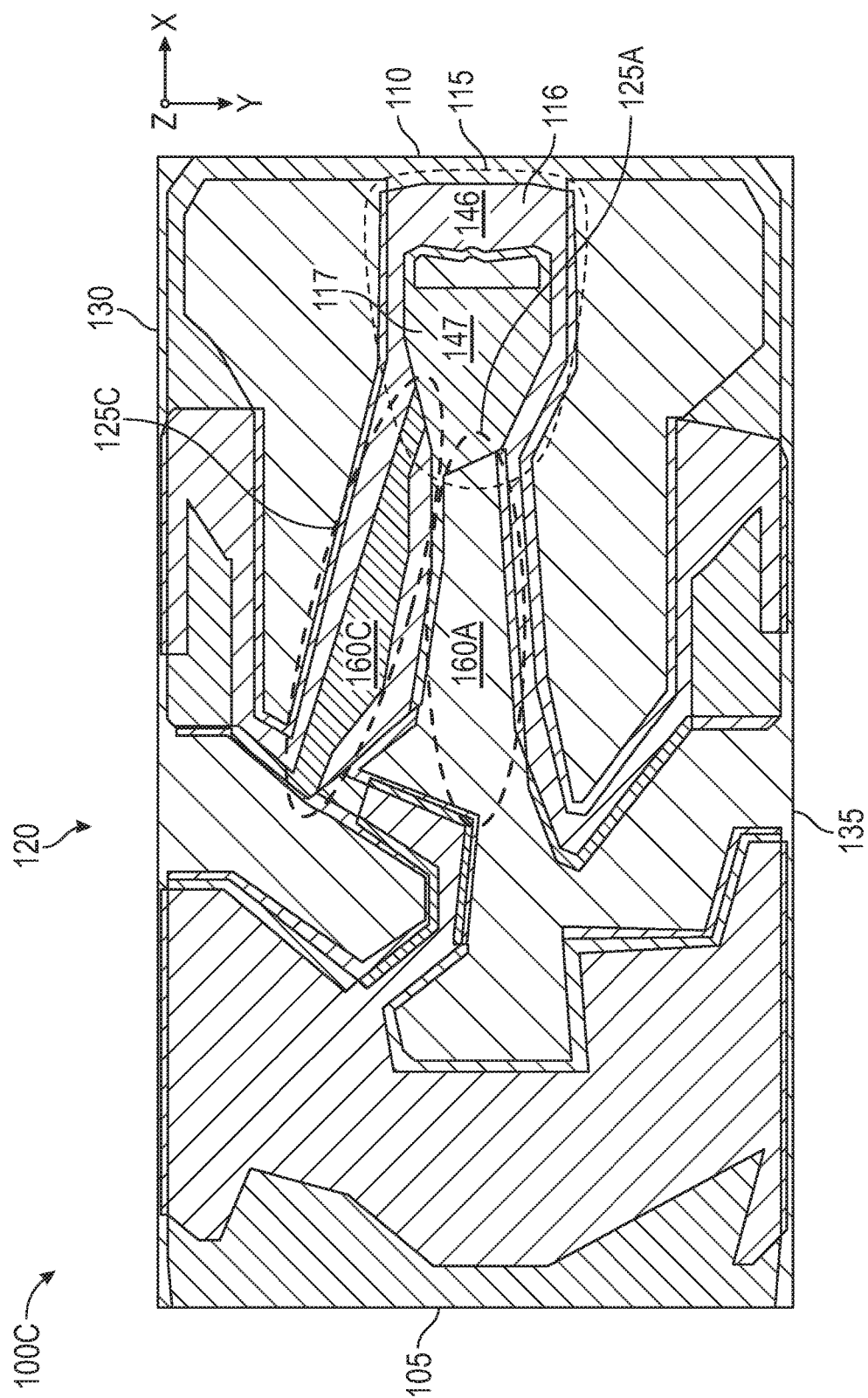
FIG. 4 is an ABS view of another slider in accordance with some embodiments.

Referring again to FIG. 3A, the exemplary slider 100B includes three channels, 125A, 125B, and 125C. Such configurations may provide designers with ample degrees of design freedom, but there is no requirement for three channels 125, and other embodiments may include more or fewer than three channels 125. For example, FIG. 4 illustrates an exemplary slider 100C having two channels 125A, 125C in accordance with some embodiments. The slider 100C has a leading edge 105, a trailing edge 110, an inner diameter edge 130, and an outer diameter edge 135. The slider 100C has an ABS 120, which includes a trailing end 115 comprising a trailing pad 116 and a surface 117, oriented as described in the discussion of FIG. 3A. The trailing pad 116 may, for example, accommodate a read/write head 29 of a disk drive 10.

In the exemplary embodiment of FIG. 4, the ABS 120 also includes two channels 125, namely a center channel 125A and an inner-diameter channel 125C, which is adjacent to the center channel 125A. Each of the channels 125 is configured to direct gas toward the trailing end 115. Because of the rotation of the disk 16 in a hard drive 10, gas flows generally from the leading edge 105 toward the trailing edge 110, and the channels 125 are oriented to capture gas and increase the gas pressure at the trailing end 115.

As shown in the example slider 100C shown in FIG. 4, each of the channels 125A, 125C is connected to the trailing end 115 and is adjacent to (i.e., abuts) the surface 117. Because of the direction of gas flow, the exit area of each of the channels 125A, 125C is adjacent to the surface 117.

Each of the channels 125A, 125C has a respective interior surface 160A, 160C, which, as discussed above in the context of FIGS. 3B-3F, may have any suitable characteristics (e.g., size, shape, dimensions, features, etc.).

Figure 5:
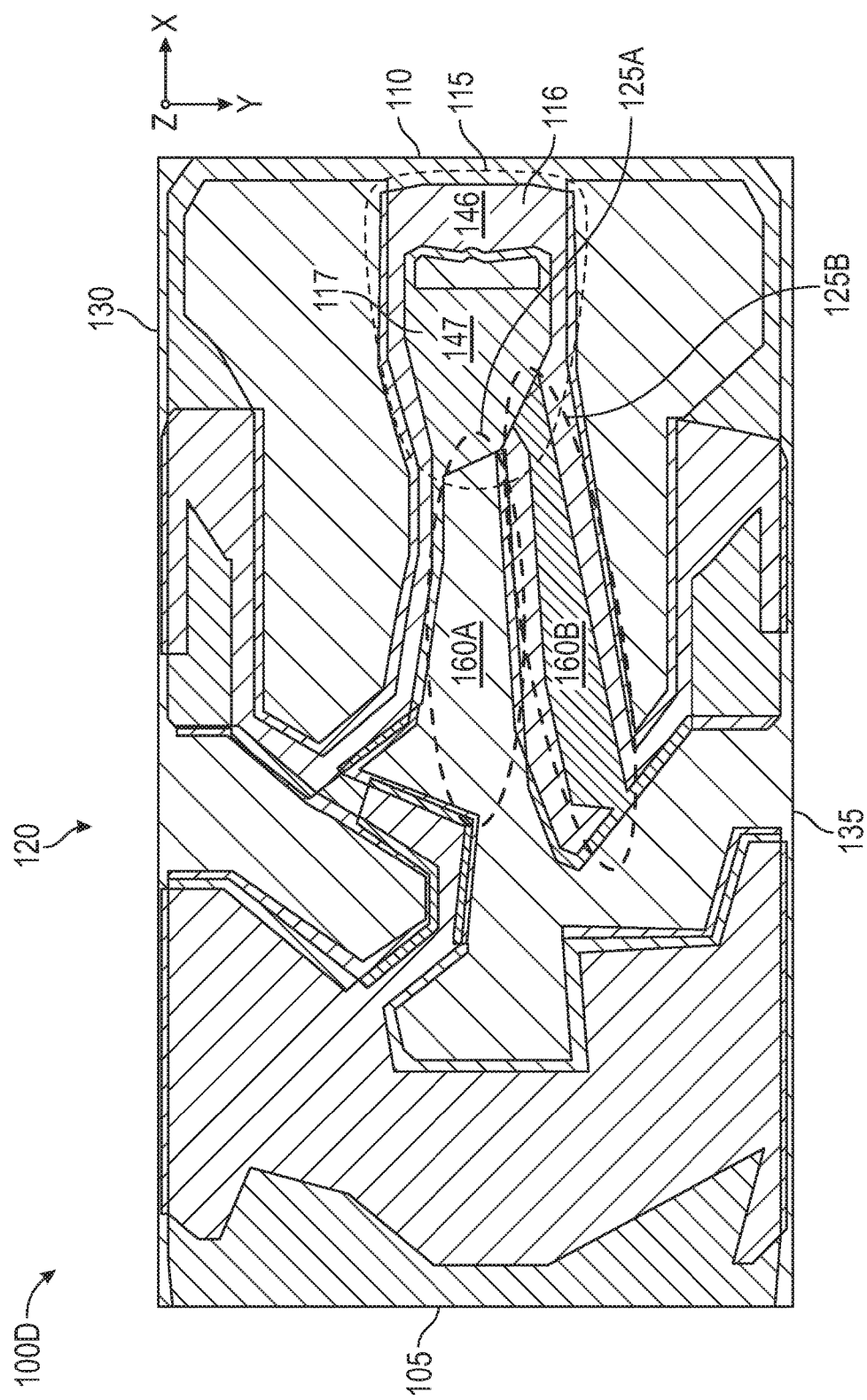
FIG. 5 is an ABS view of another slider in accordance with some embodiments.

FIG. 5 illustrates an exemplary slider 100D in accordance with some embodiments. The slider 100D has a leading edge 105, a trailing edge 110, an inner diameter edge 130, and an outer diameter edge 135. The slider 100D has an ABS 120, which includes a trailing end 115 comprising a trailing pad 116 and a surface 117, oriented as described in the discussion of FIG. 3A. The trailing pad 116 may, for example, accommodate a read/write head 29 of a disk drive 10.

In the exemplary embodiment of FIG. 5, the ABS 120 also includes two channels 125, namely a center channel 125A and an outer-diameter channel 125B, which is adjacent to the center channel 125A. Each of the channels 125A, 125B is configured to direct gas toward the trailing end 115. Because of the rotation of the disk 16 in a hard drive 10, gas flows generally from the leading edge 105 toward the trailing edge 110, and the channels 125A, 125B are oriented to capture gas and increase the gas pressure at the trailing end 115.

As shown in the example slider 100D shown in FIG. 5, each of the channels 125A, 125B is connected to the trailing end 115 and is adjacent to (i.e., abuts) the surface 117. Because of the direction of gas flow, the exit area of each of the channels 125A, 125B is adjacent to the surface 117.

Each of the channels 125A, 125B has a respective interior surface 160A, 160B, which, as discussed above in the context of FIGS. 3B-3F, may have any suitable characteristics (e.g., size, shape, dimensions, features, etc.).

Figure 6:
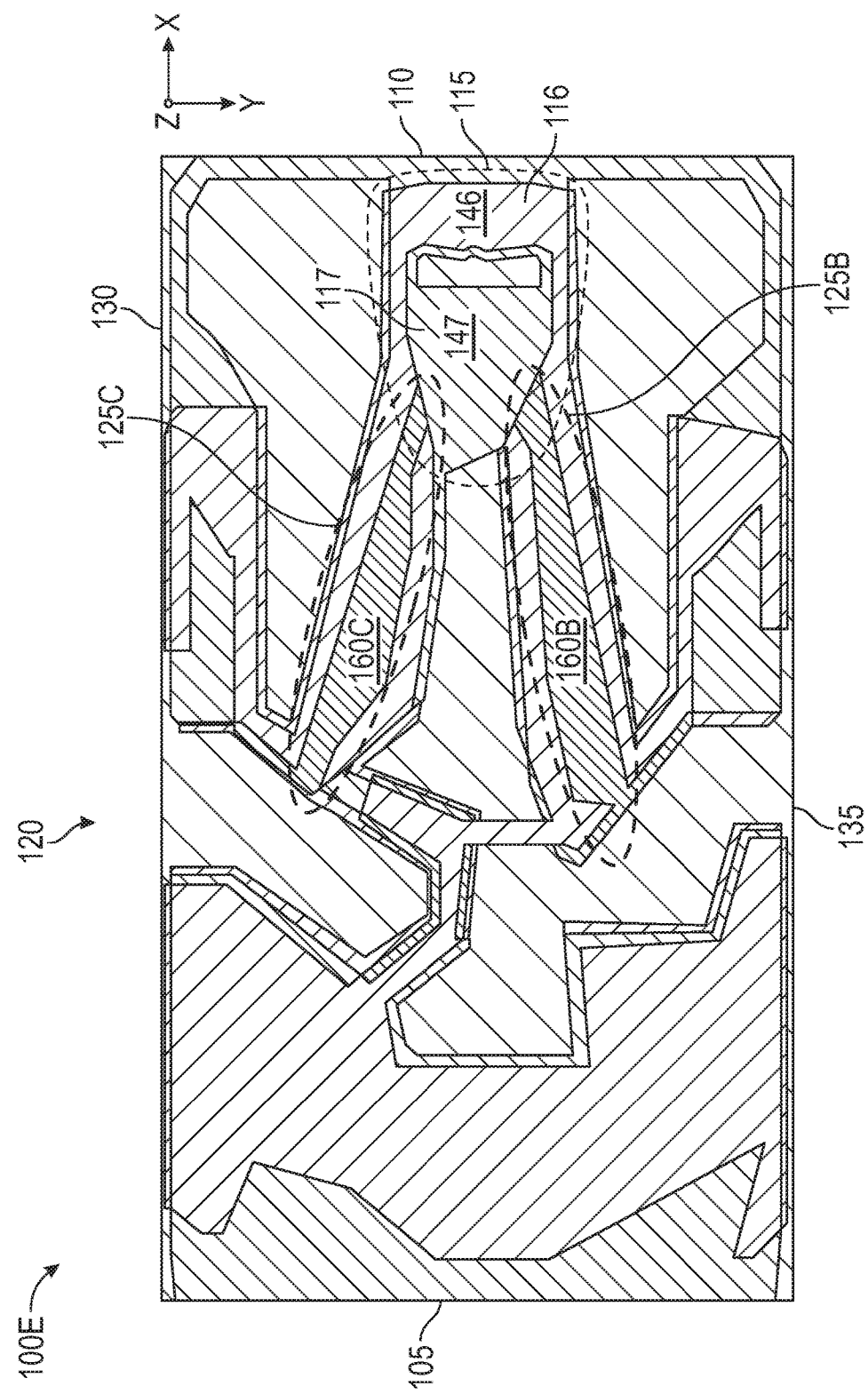
FIG. 6 is an ABS view of another slider in accordance with some embodiments.

FIG. 6 illustrates an exemplary slider 100E in accordance with some embodiments. The slider 100E has a leading edge 105, a trailing edge 110, an inner diameter edge 130, and an outer diameter edge 135. The slider 100E has an ABS 120, which includes a trailing end 115 comprising a trailing pad 116 and a surface 117, oriented as described in the discussion of FIG. 3A. The trailing pad 116 may, for example, accommodate a read/write head 29 of a disk drive 10.

In the exemplary embodiment of FIG. 6, the ABS 120 also includes two channels 125, namely an inner-diameter channel 125C and an outer-diameter channel 125B. In the embodiment of FIG. 6, the inner-diameter channel 125C and the outer-diameter channel 125B are non-adjacent. Each of the channels 125B, 125C is configured to direct gas toward the trailing end 115. Because of the rotation of the disk 16 in a hard drive 10, gas flows generally from the leading edge 105 toward the trailing edge 110, and the channels 125B, 125C are oriented to capture gas and increase the gas pressure at the trailing end 115.

As shown in the example slider 100E shown in FIG. 6, each of the channels 125 is connected to the trailing end 115 and is adjacent to (i.e., abuts) the surface 117. Because of the direction of gas flow, the exit area of each of the channels 125B, 125C is adjacent to the surface 117.

Each of the channels 125B, 125C has a respective interior surface 160B, 160C, which, as discussed above in the context of FIGS. 3B-3F, may have any suitable characteristics (e.g., size, shape, dimensions, features, etc.).

Incorporation of two or more of the channels 125A, 125B, 125C disclosed herein may enable slider 28 ABS 120 designs that collect substantially more gas than conventional slider designs and thereby improve slider 28 flight characteristics in sub-ambient-pressure environments.

In the foregoing description and in the accompanying drawings, specific terminology has been set forth to provide a thorough understanding of the disclosed embodiments. In some instances, the terminology may imply specific details that are not required to practice the invention.

It is to be understood that although this document uses sealed helium hard drives as examples of lower-pressure operating conditions, those conditions may be the result of other things, such as, for example, operation at higher-than-standard altitudes. Likewise, although helium is given as an example of one type of gas that may be used to provide the benefits of lower-pressure environments, other gases may be used instead or in addition. The ABS designs disclosed herein are generally useful in any environment in which it is desirable to increase gas pressure to improve slider flight characteristics.

It is also to be understood that although this document refers to surfaces as being "smooth," this characterization is at a macro level. Because of the processes used to fabricate sliders (e.g., etching, milling, etc.), the surfaces may not be completely smooth at microscopic levels.

To avoid obscuring the present disclosure unnecessarily, well-known components (e.g., of a disk drive, a slider, etc.) are shown in block diagram form and/or are not discussed in detail or, in some cases, at all. Unless otherwise indicated herein, prior-art fabrication processes and known materials may be used for the disclosed sliders 100.

Unless otherwise specifically defined herein, all terms are to be given their broadest possible interpretation, including meanings implied from the specification and drawings and meanings understood by those skilled in the art and/or as defined in dictionaries, treatises, etc.

As used in the specification and the appended claims, the singular forms "a," "an" and "the" do not exclude plural referents unless otherwise specified. The word "or" is to be interpreted as inclusive unless otherwise specified. Thus, the phrase "A or B" is to be interpreted as meaning all of the following: "both A and B," "A but not B," and "B but not A." Any use of "and/or" herein does not mean that the word "or" alone connotes exclusivity.

The term "coupled" is used herein to express a direct connection as well as a connection through one or more intervening circuits or structures. To the extent that the terms "include(s)," "having," "has," "with," and variants thereof are used in the detailed description or the claims, such terms are intended to be inclusive in a manner similar to the term "comprising," i.e., meaning "including but not limited to." The terms "exemplary" and "embodiment" are used to express examples, not preferences or requirements.

The terms "over," "under," "between," and "on" are used herein refer to a relative position of one layer with respect to other layers. For example, one layer disposed "over" or "under" another layer may be directly in contact with the other layer or may have one or more intervening layers. Moreover, one layer disposed "between" two layers may be directly in contact with the two layers or may have one or more intervening layers. In contrast, a first layer "on" a second layer is in contact with that second layer. Additionally, the relative position of one layer with respect to other layers is provided assuming operations are performed relative to a substrate without consideration of the absolute orientation of the substrate.

Although the drawings illustrate most layers as being single layers, many of these layers may have multilayer structures, as would be appreciated by a person having ordinary skill in the art. Similarly, the drawings are not necessarily to scale, and the dimensions of the slider 100 may differ substantially from how they are depicted in the drawings.

Although specific embodiments have been disclosed, it will be evident that various modifications and changes may be made thereto without departing from the broader spirit and scope of the disclosure. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

I claim:

1. A slider for a data storage device, the slider comprising:
   a leading edge; and
   an air-bearing surface (ABS) comprising:
   a trailing end comprising a trailing pad, and
   a plurality of channels configured to direct gas in a direction from the leading edge toward the trailing end, wherein each of the plurality of channels is connected to the trailing end, and wherein each of the plurality of channels has a respective interior surface, an entirety of which is visible in an ABS view of the slider.

2. The slider recited in claim 1, wherein the plurality of channels comprises a center channel and an inner-diameter channel or an outer-diameter channel.

3. The slider recited in claim 1, wherein the plurality of channels comprises an inner-diameter channel and an outer-diameter channel.

4. The slider recited in claim 1, wherein the plurality of channels comprises a center channel, an inner-diameter channel, and an outer-diameter channel.

5. The slider recited in claim 1, wherein a number of the plurality of channels is an odd number.

6. The slider recited in claim 1, wherein the plurality of channels comprises a first channel and a second channel, wherein the first and second channels are adjacent.

7. The slider recited in claim 1, wherein a floor of at least one of the plurality of channels is substantially flat.

8. The slider recited in claim 1, wherein the plurality of channels comprises a first channel and a second channel, and wherein, in an orientation in which the ABS is oriented upward, a level of a floor of the first channel is lower than a level of a floor of the second channel.

9. The slider recited in claim 8, wherein the floor of the first channel and the floor of the second channel are substantially flat.

10. The slider recited in claim 8, wherein the first channel is a center channel.

11. The slider recited in claim 1, wherein an interior surface of at least one of the plurality of channels is substantially parabolic.

12. The slider recited in claim 1, wherein an interior surface of at least one of the plurality of channels is substantially smooth.

13. The slider recited in claim 1, wherein each of the plurality of channels has a width of at least 1 micron and a depth of at least 1 nanometer.

14. A data storage device comprising the slider recited in claim 1.

15. A slider for a data storage device, the slider comprising:
   a trailing pad disposed closer to a trailing edge of the slider than to a leading edge of the slider;
   a surface disposed between the trailing pad and the leading edge of the slider;
   an inner-diameter channel for directing gas toward the trailing pad, wherein an exit area of the inner-diameter channel is adjacent to the surface;
   an outer-diameter channel for directing gas toward the trailing pad, wherein an exit area of the outer-diameter channel is adjacent to the surface; and
   a center channel for directing gas toward the trailing pad, wherein an exit area of the center channel is adjacent to the surface,
   wherein, in an orientation in which an air-bearing surface (ABS) of the slider is oriented upward:
   a level of the trailing pad is above a level of the surface,
   the inner-diameter channel is at a first depth below the level of the trailing pad,
   the center channel is at a second depth below the level of the trailing pad, and
   the outer-diameter channel is at a third depth below the trailing pad.

16. The slider recited in claim 15, wherein the second depth is greater than one or both of the first and third depths.

17. The slider recited in claim 16, wherein the first and third depths are substantially equal.

18. The slider recited in claim 15, wherein at least a portion of an interior surface of at least one of the inner-diameter channel, the outer-diameter channel, or the center channel is substantially smooth.

19. The slider recited in claim 15, wherein at least a portion of an interior surface of at least one of the inner-diameter channel, the outer-diameter channel, or the center channel is substantially parabolic.

20. The slider recited in claim 15, wherein at least a portion of at least one of the inner-diameter channel, the outer-diameter channel, or the center channel has a substantially flat floor.

21. A data storage device comprising the slider recited in claim 15.

\* \* \* \* \*